(12) United States Patent
Landon

(10) Patent No.: US 9,546,550 B2
(45) Date of Patent: Jan. 17, 2017

(54) BYPASS FOIL

(71) Applicant: Thomas Francis Landon, Evergreen, CO (US)

(72) Inventor: Thomas Francis Landon, Evergreen, CO (US)

(73) Assignee: Thomas Francis Landon, Evergreen, CO (US)

( * ) Notice: Subject to any disclaimer, the term of this patent is extended or adjusted under 35 U.S.C. 154(b) by 866 days.

(21) Appl. No.: 13/853,002

(22) Filed: Mar. 28, 2013

(65) Prior Publication Data

US 2013/0280030 A1    Oct. 24, 2013

Related U.S. Application Data

(60) Provisional application No. 61/687,290, filed on Apr. 23, 2012.

(51) Int. Cl.
| | |
|---|---|
| *F01D 5/02* | (2006.01) |
| *F03B 11/00* | (2006.01) |
| *F03B 17/00* | (2006.01) |
| *F01D 11/00* | (2006.01) |

(52) U.S. Cl.
CPC .............. *F01D 5/02* (2013.01); *F03B 11/00* (2013.01); *F03B 17/00* (2013.01); *F03D 80/00* (2016.05); *Y02E 10/20* (2013.01); *Y02E 10/226* (2013.01); *Y02E 10/722* (2013.01)

(58) Field of Classification Search
CPC ............ F01D 5/02; F01D 11/00; F03D 1/04; F03D 3/0427; F03B 17/00; F03B 11/00; Y02E 10/20; Y02E 10/226; Y02E 10/722

USPC ...................... 415/1, 4.1, 115, 183
See application file for complete search history.

(56) References Cited

U.S. PATENT DOCUMENTS

| | | |
|---|---|---|
| 1,013,508 A | 1/1912 | Morgenstern |
| 4,686,376 A | 8/1987 | Retz |
| 5,134,855 A | 8/1992 | Belcher et al. |
| 5,947,678 A | 9/1999 | Bergstein |
| 6,969,230 B2 * | 11/2005 | Shi ..................... F01D 5/187 |
| | | 415/115 |
| 7,182,573 B2 | 2/2007 | Jonsson |

(Continued)

FOREIGN PATENT DOCUMENTS

| | | |
|---|---|---|
| CN | 2047727 U | 5/1989 |
| EP | 0432891 B1 | 5/1996 |

(Continued)

*Primary Examiner* — Audrey K Bradley
*Assistant Examiner* — Dapinder Singh

(57) ABSTRACT

An apparatus for providing electrical power includes a foil having a leading inlet, at least rotor internal to the foil and downstream from the inlet and a trailing flow separator partially within a trailing chamber. The apparatus also includes leading and trailing edges configured such that fluid flowing through the foil experiences decreased pressure and increased velocity at the trailing edges relative to the leading edges. In a method utilizing the disclosed apparatus within a fluid flow, a first quantity of a high-pressure fluid is passed, at a low velocity, into the leading inlet of the bypass foil. One or more rotors are rotated by the flow and the rotational energy is translated into electrical power with a generator. After turning the rotors, quantity of fluid is ejected, at a high velocity, to the trailing edges of the bypass foil at an area of low fluid pressure.

20 Claims, 5 Drawing Sheets

(56) References Cited

U.S. PATENT DOCUMENTS

| | | |
|---|---|---|
| 7,832,979 B2 | 11/2010 | Yaras et al. |
| 7,874,788 B2 | 1/2011 | Stothers et al. |
| 2005/0201855 A1* | 9/2005 | Fan .................. F03D 3/002 |
| | | 415/4.1 |
| 2010/0289268 A1 | 11/2010 | Schiller |
| 2013/0136576 A1* | 5/2013 | Wojnar .................. F03D 1/04 |
| | | 415/1 |
| 2015/0167626 A1* | 6/2015 | Roberts .................. F03B 13/08 |
| | | 415/121.3 |
| 2015/0337878 A1* | 11/2015 | Schlosser .............. F15D 1/003 |
| | | 181/213 |

FOREIGN PATENT DOCUMENTS

| | | |
|---|---|---|
| FR | 2048422 | 1/2011 |
| GB | 0233239 | 5/1925 |
| WO | 99/66200 | 12/1999 |
| WO | 03/078831 | 9/2003 |
| WO | 2010/114391 | 4/2010 |
| WO | 2010/086474 | 5/2010 |
| WO | 2011/109003 A1 | 9/2011 |
| WO | WO 2012/000040 * | 1/2012 |
| WO | 2012/025449 A1 | 3/2012 |

\* cited by examiner

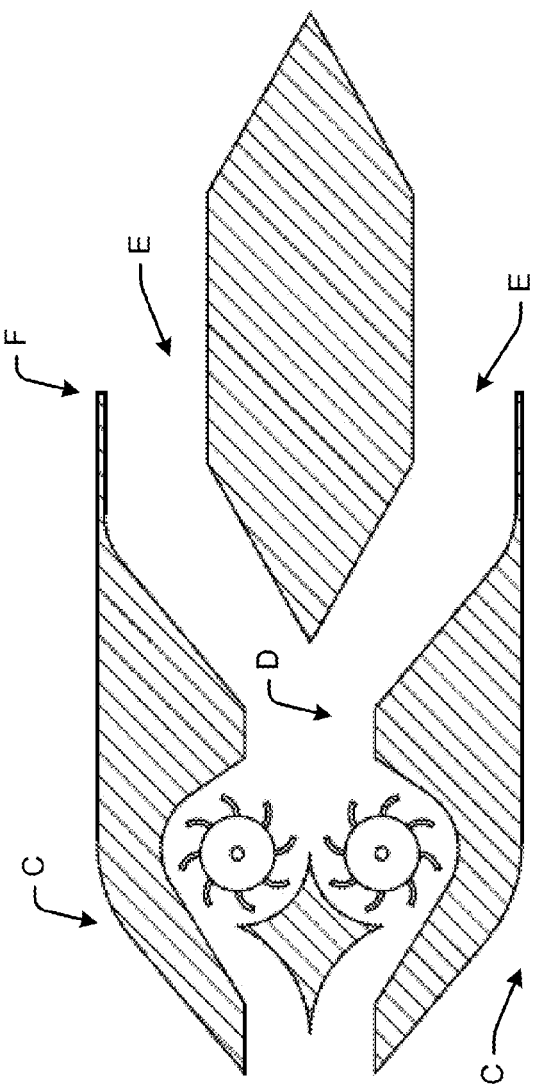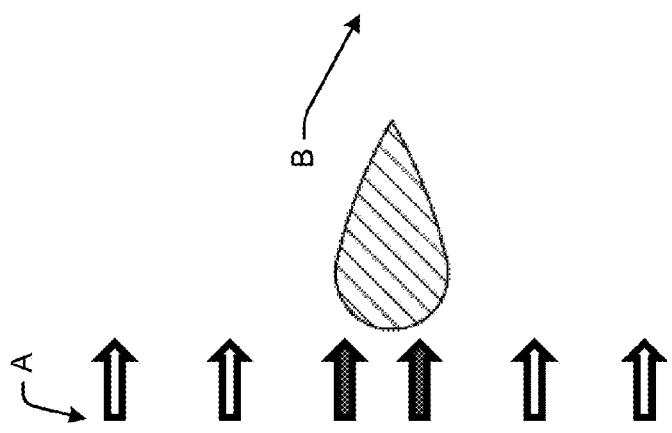

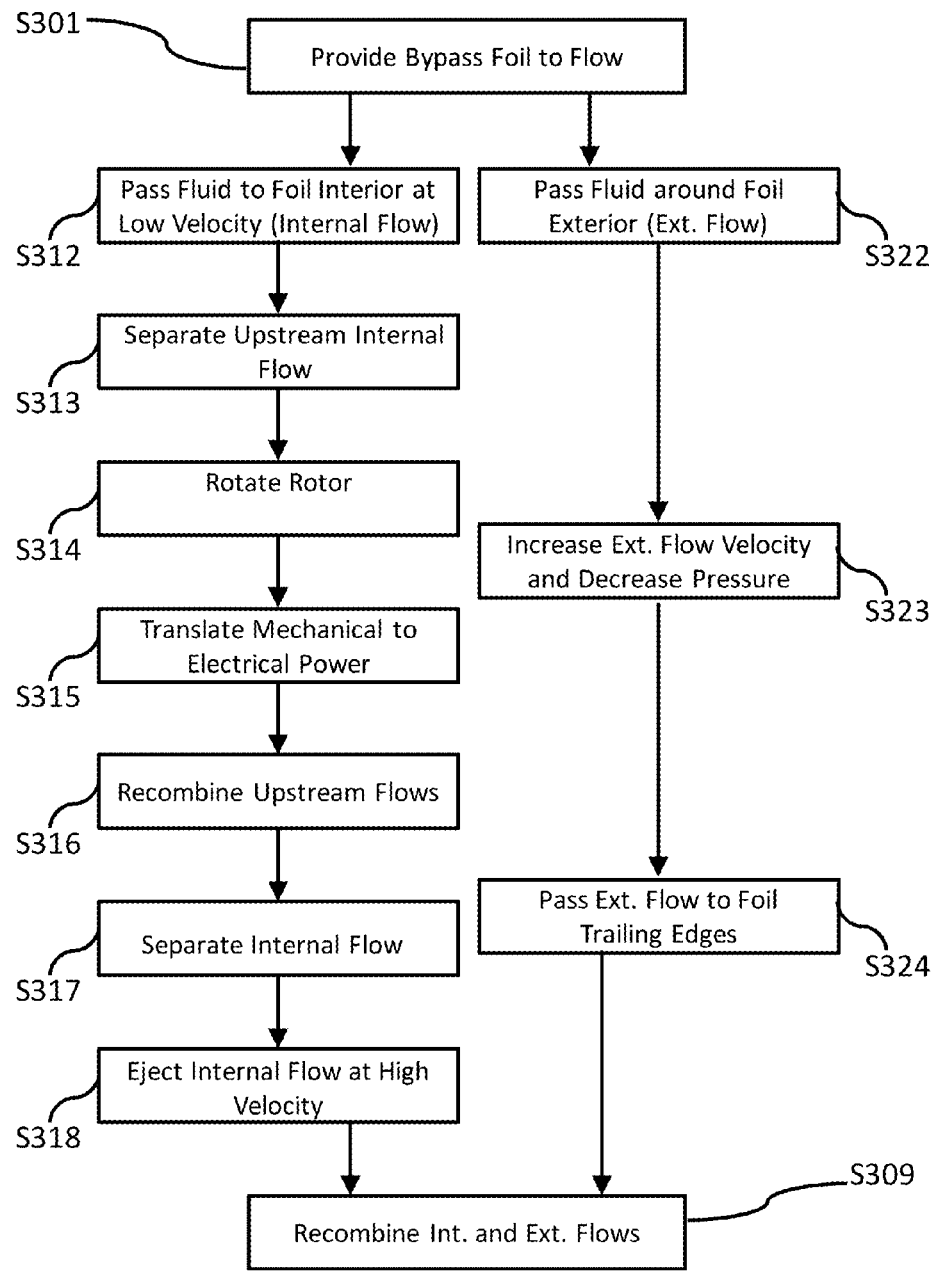

BYPASS FOIL

PRIORITY CLAIM

This application claims the benefit of U.S. Provisional Patent Application No. 61/687,290 titled "Bypass foil" of Thomas Francis Landon, filed on Apr. 23, 2012, and incorporated in its entirety by reference as though fully set forth herein.

BACKGROUND

Understanding principles of fluid mechanics has enabled humankind to direct fluid (air, water, and other gas or liquid) flows and harness flow energies in a wide variety of circumstances. The Venturi effect in fluid dynamics occurs at a constriction of a lumen through which a fluid flows. Any fluid passing through the constriction experiences an increase in velocity, because fluid velocity is inversely related to the cross section of a lumen through which the fluid passes. So that mechanical energy is conserved when the fluid velocity and the corresponding kinetic energy are increased, potential energy and the corresponding fluid pressure decreases. Therefore, the Venturi effect refers to the increase of velocity and the accompanying decrease of pressure at a constriction in a pipe. The Venturi effect and other properties of fluid dynamics have been studied and exploited in a wide range of applications.

BRIEF DESCRIPTION OF THE DRAWINGS

FIGS. 3A-D are cross sectional views of a flow front at progressing stages during its flow through the example bypass foil shown in FIG. 1.

FIG. 4 is a flow diagram of an example method of generating power with the example bypass foil.

DETAILED DESCRIPTION

Figure 1:
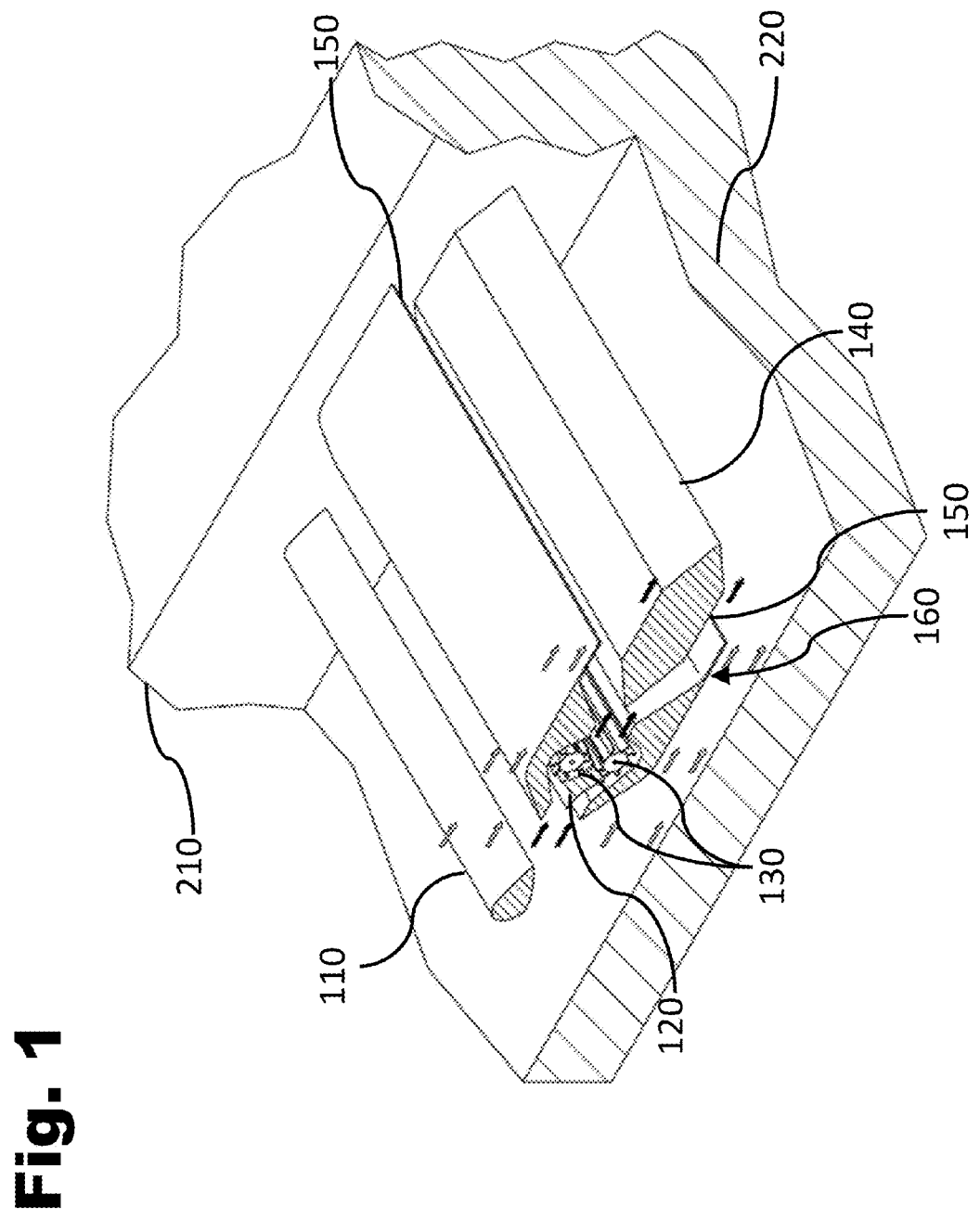
FIG. 1 is a partial cut-away perspective view of an example bypass foil.

There is an increasing demand for clean, sustainable energy. Known energy-harvesting systems which take advantage of renewable natural resources include, but are not limited to hydroelectric plants, geothermal power plants, solar heating systems, wind farms and wave farms. Hydroelectric plants, wind farms and wave farms all exploit flowing fluid to reap its kinetic energy. Many of these systems engage a turbine with passing fluid to rotate a shaft and thereby produce a rotational mechanical energy which may subsequently converted into electrical power for storage or direct transmission to power consumers.

Use of natural fluid flow from wind, ocean currents, tides, or water flow caused by gravity in streams is of increasing interest to power generation. Because greater fluid velocities yield greater amounts of power, systems and methods encouraging increased fluid velocities may offer increased power yield. However, known attempts to increase fluid velocities through Venturi systems using head pressure have only had limited success.

A bypass foil is disclosed herein, along with systems and methods for using the bypass foil (e.g., for electrical power generation). An example system includes a foil including a leading inlet, a forward chamber downstream of the leading inlet, a rearward chamber downstream of the forward chamber and a constriction between the forward and rearward chambers. At least one rotor is provided within the forward chamber. A trailing flow separator is provided partially within the trailing chamber and including a leading edge and a trailing edge. Accordingly, fluid flowing through the foil experiences decreased pressure and increased velocity at the rearward chamber relative to the forward chamber.

In another example, a bypass foil system includes at least one rotor, and at least one generator operatively coupled with the at least one rotor to receive mechanical energy transferred to the rotor from a flow. A foil including upper and lower portions having exterior surfaces extending between leading and trailing edges and an interior portion defined between the upper and lower portions and housing the at least one rotor. The upper and lower portion exterior surfaces are configured to decrease pressure of an external flow passing thereby relative to an interior flow passing within the interior portion.

In another example, a method includes: securing, within a fluid flow, a bypass foil having leading and trailing edges and a leading inlet; passing, at a low velocity, a first quantity of high-pressure fluid into the leading inlet of the bypass foil; rotating one or more turbine rotors with the fluid; translating turbine rotational energy; separating the quantity of fluid into two downstream flows using a trailing flow separator; and ejecting, at a high velocity, the quantity of fluid to the trailing edges of the bypass foil at an area of low fluid pressure.

Although not intended to limit the bypass foil described herein to any particular end-use, it is noted for purposes of illustration that the system and method may be implemented onboard a vessel ship or watercraft. For example, the bypass foil can be operated by movement of the watercraft through the water and/or the flow of the current/stream, e.g., when the watercraft is anchored, thereby providing a clean source of energy onboard the watercraft.

Before continuing, it is noted that as used herein, the terms "includes" and "including" mean, but is not limited to, "includes" or "including" and "includes at least" or "including at least." The term "based on" means "based on" and "based at least in part on."

Fluid flow foils may be of a variety of shapes and sizes, but generally include upper and lower surfaces extending between a larger cross-section leading edge and a thin, tapering trailing edge. Fluid encountering the leading edge of the foil is constricted as the fluid passes around the upper and lower surfaces of the fluid. This causes an increase in velocity. If the distance from the leading edge to the trailing edge of the foil is different across these two surfaces, there is a pressure differential between the fluids acting at the respective surfaces. The difference in velocities and the corresponding pressure difference can be explained by the Bernoulli Principle.

A bypass foil is described herein configured based on differential pressures which increase the velocity of a fluid into which it is disposed to thereby improve the efficiency of an electrical power generation system. The bypass foil and systems and methods disclosed herein, for example, may be used to increase the velocity of fluids including water or wind and improve efficiency of devices used in the generation of power from these fluids.

In an aquatic environment the bypass foil and power generation system may be secured, for example, to the bottom of the body of water, and can operate at any depth beneath the surface to take advantage of underwater currents.

With little impact on aquatic life, the system can function in rivers and ocean currents and in areas where water flow reverses direction such as in tidal water. Through dimensioning, the system may be configured to be completely submerged reducing if not eliminate interference with surface vessels and may continue to operate during adverse weather conditions or under ice or any other items floating on the surface.

It is noted that the bypass foil and systems and methods described herein, are capable of operation in any fluid dynamic environment. Before continuing, it should be noted that the examples described above are provided for purposes of illustration, and are not intended to be limiting. Other devices and/or device configurations may be utilized to carry out the operations described herein.

Figure 2:
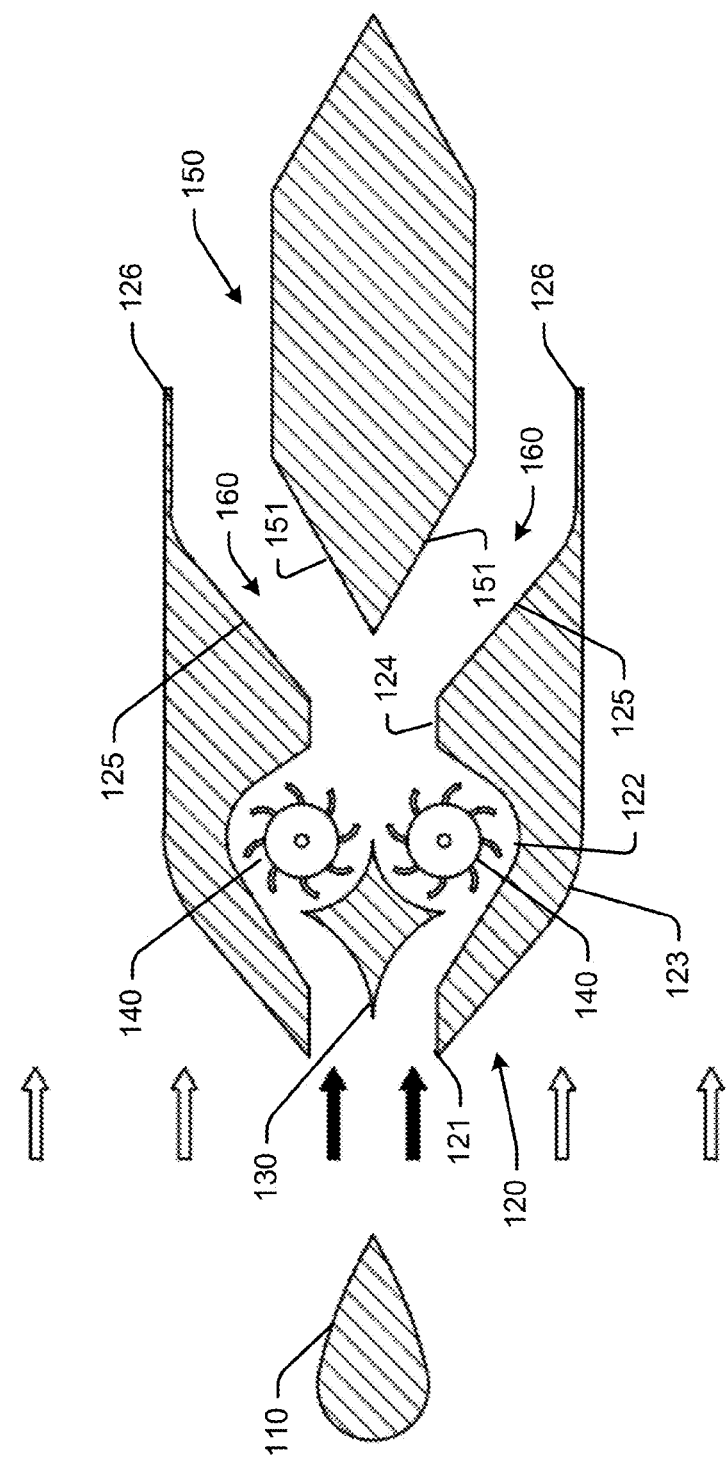
FIG. 2 is a cross section view of the example bypass foil shown in FIG. 1.

FIG. 1 is a partial cut-away perspective view of an example bypass foil while FIG. 2 is a cross section view of the example bypass foil of FIG. 1. Bypass foil 120 includes a leading inlet formed between leading edges 121 of respective upper and lower shell components. The upper and lower shell components 120 form a forward chamber 122 downstream of the leading inlet, a rearward chamber 160 downstream of the forward chamber 122 and a constriction 124 between the forward 122 and rearward 160 chambers.

The upper and lower portions include cambers 123 may have a substantially equal curvature on exterior surfaces between leading 121 and trailing 126 edges. In a fluid flow, leading edges 121 experience relatively high pressure and low fluid velocity while trailing edges 126 experience relatively low pressure and high fluid velocity.

In an example, the height defined between the upper and lower portion exterior surfaces at leading edges 121 is less than the height at the trailing edges 126. This height difference, in combination with cambers 123, contributes to increasing velocity of a passing external flow relative to an interior flow passing within interior portion (e.g., 122, 124, 160) of the bypass foil.

In an example, the cross section of each of the upper and lower portions at the trailing edges 126 is less than a cross section of the upper and lower portions at the leading edges 121. In an example, the upper and lower foil components may taper from constriction 124 to a very thin trailing edge 126.

In another example, rather than being formed as separate upper and lower shell components, foil 120 may be formed as a single, monolithic body.

A leading flow separator 130 may be provided within forward chamber 122 and include thin leading and trailing edges. A trailing flow separator 150 partially within the trailing chamber includes a leading edge having leading surfaces 151 and a trailing edge. Leading surfaces 151 collaborate with rearward surfaces 125 of the upper and lower shells to define diverging arteries within rearward chamber 160. Arteries 160 open at trailing edges 126 to the areas of greatest fluid velocity and lowest fluid pressure. Arteries 160 are configured to contribute to decreasing interior flow pressure while increasing interior flow velocity.

Generally, fluid flowing through the foil interior experiences decreased pressure and increased velocity at the rearward chamber relative to the forward chamber. In an example, the total cross section of the diverging arteries 160 is equal to or greater than a cross section of the leading inlet at leading edges 121.

In an example, at least one rotor 140 is provided within forward chamber 122 and includes blades or buckets configured to capture mechanical energy from the flowing fluid. The location of one or more rotors 140 within forward chamber 122 may contribute to reducing drag on the rotors 140. In an example, the apparatus may comprise two or more rotors. An example including an even number of rotors may provide equal numbers of rotors on opposite sides of the trailing edge of first flow separator 130.

In an example, the system may include at least one electric generator operatively coupled to said rotating or spinning apparatus, either directly or through a series of gears. After passing rotors 140, fluid is channeled into two separate arteries of size equal or greater than the leading inlet.

In an example, the system further implements a hydraulic pump and hydraulic lines to transfer hydraulic pressure to operate a remote electrical generator.

In an example, the foil is a laminar foil. The system may also include a leading edge debris diverter 110 provided in a position upstream from the leading inlet to protect the water foil from large debris which may be adrift in the water flow. In an example, the system may include a fitted screen configured to stop ingress of debris and marine life.

The system may also yield increased power generation capacity with an increase in system dimensions. The system may be placed on the sub-aquatic floor directly or raised on a platform and is capable of operation at any depth or angle beneath the surface. In an example, a pivoting platform may be included to enable alignment of the system with excising water flow.

Figure 3B:
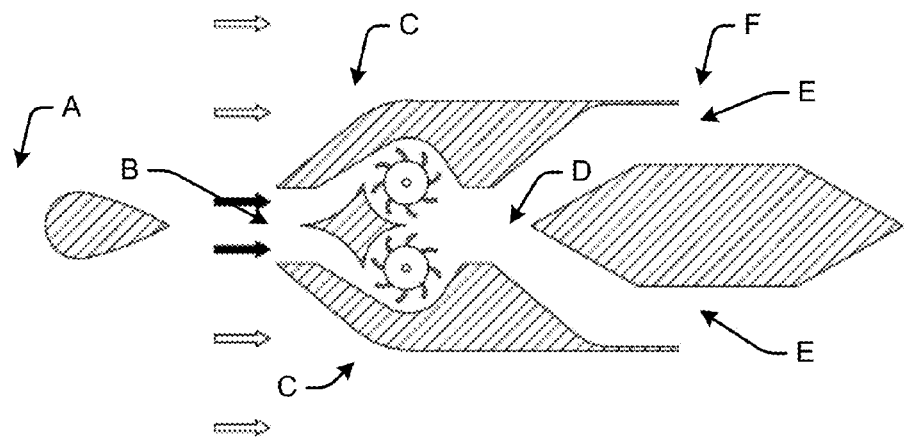

Conditions of a fluid at several stages of passing an example bypass foil and turbine system are described with reference to FIGS. 3A-3D. For purposes of illustration, a first quantity of fluid designated by arrows, is in a natural state at location A (FIG. 3A). In an example including a debris diverter, the debris diverter may have a small effect on the flow. Regardless of the provision of a debris diverter, flow enters a foil at high pressure and low velocity at B (FIG. 3B).

Figure 3C:
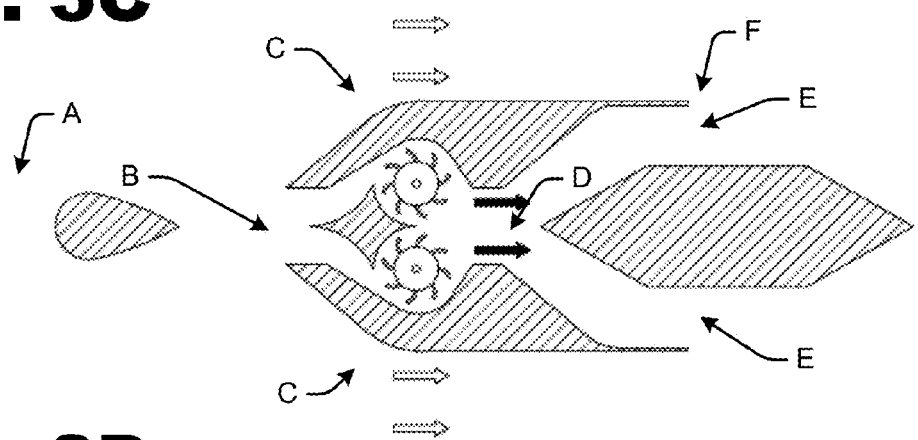

As the first quantity of fluid moves through the interior of the foil, a second quantity of fluid moves around cambers and experiences increasing velocity and decreasing pressure at C (FIG. 3C).

Figure 3D:
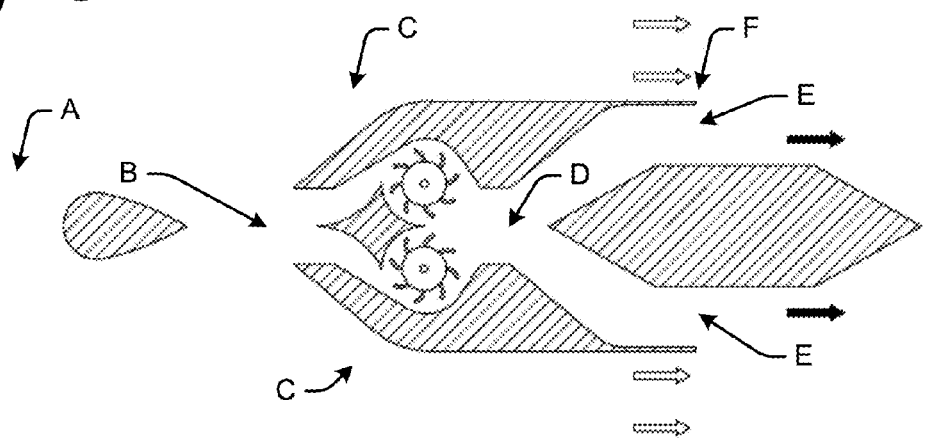

After passing through a forward chamber and the turbine rotors, the first quantity of fluid, due to a constriction, experiences increasing velocity and decreasing pressure at region D (FIG. 3C). Upon exiting the constriction, the fluid encounters a trailing flow separator and experiences a further increase in velocity and decrease in pressure at region E. The internal and external flows reconvene at F, a region of the low pressure (FIG. 3D).

FIG. 4 is a flow diagram of an example method of generating electrical power wherein a fluid pressure drop between the leading and trailing edges is established to increase fluid velocity between the same.

In step S301, a laminar bypass foil having leading and trailing edges and a leading inlet is secured within a flowing fluid. In an aquatic environment, the system may be secured to the bottom of the body of water and can operate at any depth beneath the surface to take advantage of underwater currents. Depending on the depth of the body of fluid, the system may be partially or completely submerged. When submerged, the system is capable of functioning under ice or any other items on the surface, may reduce or eliminate interference with surface vessels and has very little impact on aquatic animals.

A flow designated by arrows (FIG. 3A), is in a natural state at location A. With a bypass foil in position within the fluid flow, a first quantity of high-pressure fluid is passed, at a low velocity, into the leading inlet of the bypass foil in step S312. This flow position is illustrated in FIG. 3B with reference to position B.

As the fluid flows through forward chamber 122, rotors 140 are rotated by the flow in step S314. Rotational energy of rotors 140 may then be translated into electrical power with a generator in step S315.

In an example, the quantity of fluid entering the leading inlet is separated into two upstream flows using a leading flow separator (130) in step S313. In such an example, two separated upstream flows are delivered to respective upper and lower rotors (FIGS. 1-3). As interior flow passes leading flow separator 130, the diverging flows increase in velocity and cause rotation of 140 in opposite directions.

In step S316, the two upstream flows are recombined at constriction 124. At constriction 124, the interior flow experiences another increase in velocity due to a decrease in cross-sectional area of the interior of bypass foil 120.

Shortly after passing through constriction 124, internal flow enters arteries 160 and encounters leading surfaces 151 of trailing flow separator 150 by which the interior flow may be separated into two downstream flows in step S317. Flow separator 150 again increases the internal flow velocity, decreases the internal flow pressure and diverts the internal flow out towards trailing edges 126 wherein it reconvenes with the external flow.

In step S318, the internal flow is ejected, at a high velocity, to trailing edges 126 at an area of low fluid pressure. While internal flow passes through interior of foil 120, a second quantity of fluid passes around the exterior surfaces of the upper and lower portions of foil 120 in accordance with step S322.

The second quantity of fluid passes over cambers 123 on exterior surfaces of the bypass foil and experiences an increase of velocity in step S323. A pressure difference between the quantity of fluid inside the foil (high) and outside the foil (low) accompanies the difference in velocities of the two fluid quantities. The external flow maintains a high velocity and low pressure as far as the trailing edge at E where the pressure differential is apparent.

In step S309, the first and second quantities of fluid are recombined in an area of low fluid pressure. When the internal and external flows reconvene at E, the low pressure of the external flow contributes to an increased velocity interior flow by pulling the interior flow through the interior of the bypass foil.

As described above, an example system may include a debris diverter 110. Methods making use of a system so including a debris diverter may also include a step of diverting debris carried by the fluid away from foil 120. In an example, the cross-sectional area of 160 is greater than at 121 such that pressure is additionally decreased.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A system comprising:
   a foil including a leading inlet for fluid to enter, a forward chamber within the foil downstream of the leading inlet, a rearward chamber within the foil downstream of the forward chamber, and a constriction formed by the foil between the forward and rearward chambers;
   at least one rotor within the forward chamber of the foil;
   a leading flow separator having a dual concave leading edge;
   a trailing flow separator at least partially within the trailing chamber of the foil;
   wherein fluid flowing through the foil experiences decreased pressure and increased velocity at the rearward chamber relative to the forward chamber.

2. The system of claim 1, wherein the leading flow separator has a dual concave trailing edge.

3. The system of claim 2, wherein the at least one rotor comprises at least two rotors located on opposite sides of the flow separator trailing edge.

4. The system of claim 1, further comprising a leading edge debris diverter upstream and outside of the first chamber of the foil.

5. The system of claim 1, wherein the foil operates without dynamic head pressure, and wherein dynamic flow around the exterior of the foil draws out fluid from within the foil through exits near a rear or aft of the foil.

6. The system of claim 1, wherein multiple exits near a rear or aft of the foil where fluid is drawn out into a dynamic flow region around an exterior of the foil having an exit area equal to or greater than an inlet area on a leading edge of the foil.

7. A bypass foil system comprising:
   at least one rotor;
   at least one generator operatively coupled with the at least one rotor to receive mechanical energy transferred to the rotor from a flow;
   a symmetrical foil having surfaces extending between leading and trailing edges and an interior portion, the symmetrical foil housing the at least one rotor; and
   a leading flow separator within the symmetrical foil, the leading flow separator having a dual concave leading edge;
   wherein the upper and lower portion exterior surfaces are configured to decrease pressure of an external flow passing thereby relative to an interior flow passing within the interior portion.

8. The bypass foil system of claim 7, further comprising, downstream from the at least one rotor, an interior region configured to increase interior flow velocity.

9. The bypass foil system of claim 7, further comprising a leading edge debris diverter provided in a position external and upstream from the foil.

10. The bypass foil system of claim 7, further comprising a trailing flow separator provided at least partially within the symmetrical foil and configured to increase velocity of the interior flow.

11. The bypass foil system of claim 10, further comprising diverging arteries provided between the trailing flow separator and the symmetrical foil, the arteries being configured to decrease interior flow pressure.

12. The bypass foil system of claim 7, wherein the leading flow separator has a dual concave trailing edge.

13. A method comprising:
   securing, within a fluid flow, a bypass foil having leading and trailing edges and a leading inlet;
   passing, at a low velocity, a first quantity of high-pressure fluid into the leading inlet of the bypass foil and past a leading flow separator within the bypass foil, the leading flow separator having a dual concave leading edge;
   rotating one or more turbine rotors with the fluid;
   translating turbine rotational energy;
   separating the quantity of fluid into two downstream flows using a trailing flow separator; and ejecting, at a high velocity, the quantity of fluid to the trailing edges of the bypass foil at an area of low fluid pressure.

14. The method of claim 13, further comprising:
separating the first quantity of fluid from the leading inlet into two upstream flows using a leading flow separator;
providing the two upstream flows to respective upper and lower rotors; and
recombining the two upstream flows at a constriction.

15. The method of claim 13, further comprising establishing a fluid pressure drop between the leading and trailing edges to increase fluid velocity between the leading and trailing edges.

16. The method of claim 13, further comprising providing a leading edge debris diverter upstream and outside of the inlet of the bypass foil.

17. The method of claim 13, wherein the leading flow separator has a dual concave trailing edge.

18. The method of claim 13, further comprising passing a second quantity of fluid around an exterior surface of a bypass foil.

19. The method of claim 18, wherein passing the second quantity of fluid includes passing the second quantity of fluid over cambers on an exterior surface of the bypass foil to decrease pressure of the second quantity of fluid.

20. The method of claim 18, further comprising mixing the first and second quantities of fluid at the area of low fluid pressure.

* * * * *